A. S. BIXBY.
CHAIN LINK.
APPLICATION FILED MAR. 4, 1914.
1,152,476.
Patented Sept. 7, 1915.
2 SHEETS—SHEET 1.
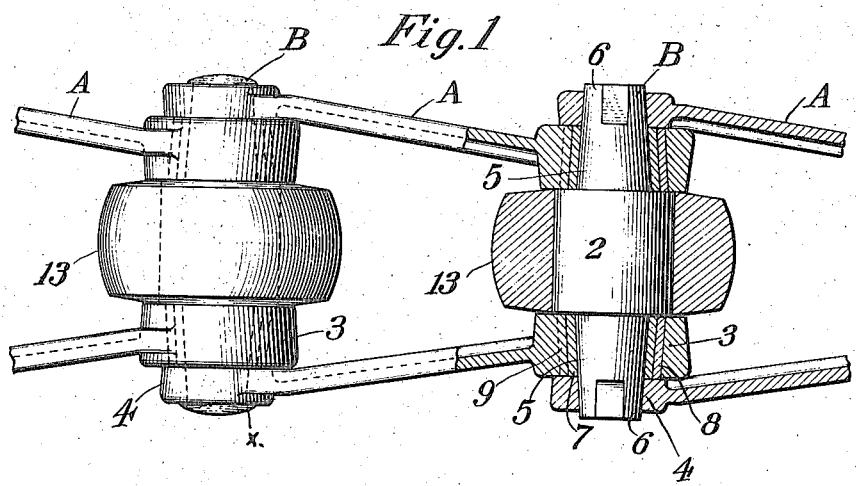
Fig. 1
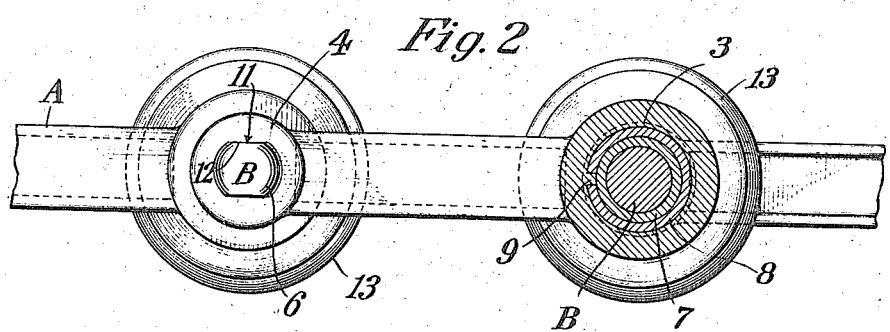
Fig. 2
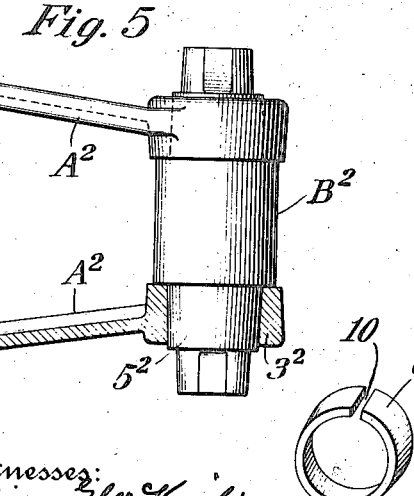
Fig. 5
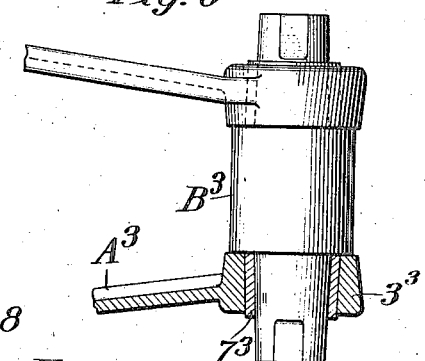
Fig. 6
Fig. 3
Witnesses:
Inventor
Allan S. Bixby
By Attorney

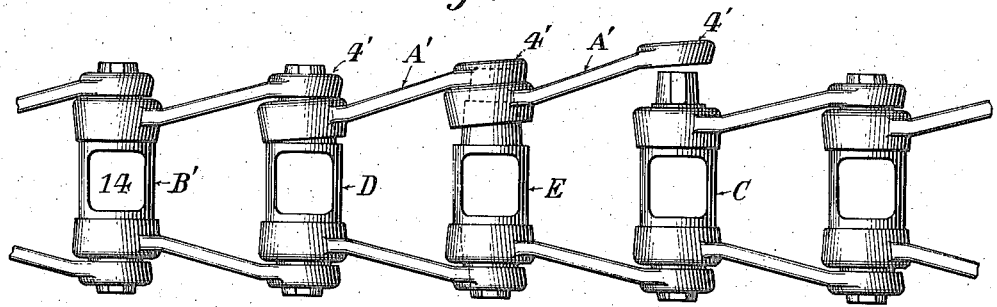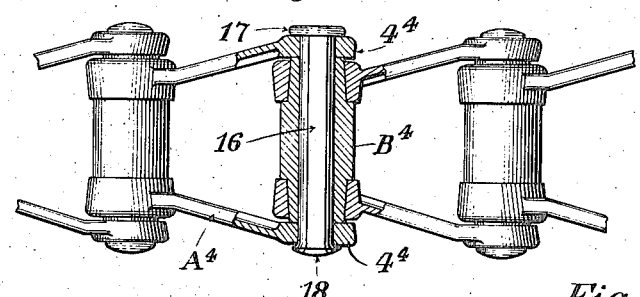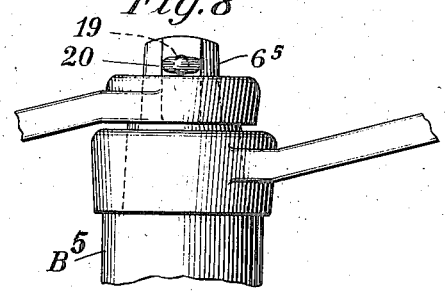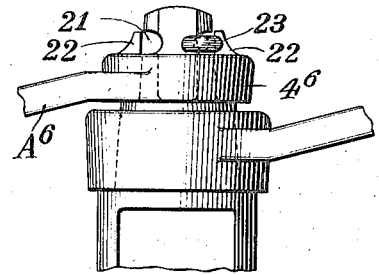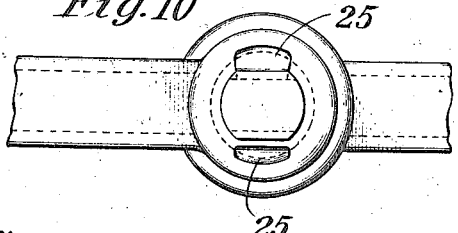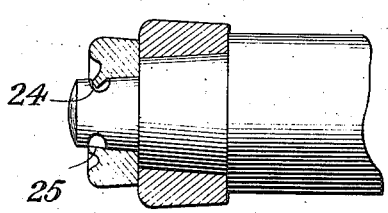

UNITED STATES PATENT OFFICE.

ALLAN S. BIXBY, OF INDIANAPOLIS, INDIANA, ASSIGNOR TO THE NATIONAL MALLEABLE CASTINGS COMPANY, OF CLEVELAND, OHIO, A CORPORATION OF OHIO.

CHAIN-LINK.

1,152,476.  Specification of Letters Patent.  Patented Sept. 7, 1915.

Application filed March 4, 1914. Serial No. 822,370.

*To all whom it may concern:*

Be it known that I, ALLAN S. BIXBY, a citizen of the United States, residing at Indianapolis, in the county of Marion and State of Indiana, have invented new and useful Improvements in Chain-Links, of which the following is a specification, reference being had to the accompanying drawings, in which—

Figure 1 shows a plan view partly in section of an embodiment of my invention in the form of a chain; Fig. 2 is an elevation thereof, partly in section; Fig. 3 is a detail thereof; Fig. 4 is a plan of a modified form thereof, showing the manner of assembling a complete chain; Figs. 5 and 6 are further modifications, partly in section; Fig. 7 is a further modification of links in plan, partly in section, showing a novel form of link coupler; Figs. 8 and 9 show plans of further modifications; Fig. 10 shows a side elevation, and Fig. 11 shows a plan, partly in section, of still another modification.

My invention relates to links for chains, and consists in providing a link comprising two side bars and a connecting pin, and in the various parts which I shall hereinafter describe and claim.

Referring to the drawings, A indicates the side bars and B the pin, having an enlarged central or bearing portion 2. Each side bar A has apertured ends 3 and 4, the apertures or eyes 3 being larger than the apertures or eyes 4. The ends of the side bars A containing the apertures 3 are adapted to be placed upon the journal portions 5 of the ends 6 of the pin B, so that they will bear against the enlarged portion 2. The ends 6 of the pin are preferably tapered and may be provided with hard iron or hardened steel thimbles 7, which may be shrunk upon the journals 5 of the pins B so that they may be secured to and turned with the pins. Bushings 8 may also be provided, which are secured to the side bars by means of the tongues 9 which project inwardly into the eye 3 and enter the split opening 10 of the bushing 8, thereby causing the bushing to turn with the side bar A and not with the pin B or its thimble 7. This gives the advantage of having the bearings between the parts which move relatively to each other composed entirely of hardened material.

The smaller eye 4 of each side bar A has flattened sides 11, thus making the eye somewhat oval in shape, and these eyes are adapted to fit over the ends 6 of each pin B beyond the journal portions 5 upon the outside of the eye portion 3 of other side bars A, and are held in fixed relation to the pin B by the flattened sides 12 of ends 6 which coöperate with the corresponding flattened portions 11 in the eyes 4. The roller 13 is seated upon the central or bearing portion 2 and is held in position thereon by the eye portions 3 of the side bars A.

In assembling the chain, the thimbles 7 having first been fixed upon the journal portions 5 of the pin B and the bushings 8 having been secured within the eyes 3 of the side bars, the roller 13 is seated on the bearing portion 2 of said pin. The eyes 3 with their bushings are then placed upon the thimbles 7. The eyes 4 of the side bars of the next succeeding link are then forced upon the ends of the said pin, the eyes 3 of the said side bars of the next succeeding link having first been placed upon the thimbles 7 of the next succeeding pin. If desired, the ends of the pin may then be upset, as shown at $x$ in Fig. 1. The succeeding links are to be formed in a similar manner.

In Fig. 4 I have shown a further modified form, in which the pins B′ have a central aperture 14, which reduces the weight of the chain. In this form I have shown chain links linked together in such manner as to make a continuous or closed chain. C indicates the first link to be assembled and D and E the last two links, the links C and E at the ends of the chain being brought together as shown, ready to be assembled to make the chain an endless link belt. The eye 4′ of the side bar A′ of link E is forced upon the end of the pin at the left of link C, after which the pin can be riveted, as well as the pin of links D and E which are left unriveted on one side until the connection has been made between links C and E to give the necessary freedom for assembling the ends of the chain.

In Fig. 5 I have shown a modified form of my invention, in which the side bars $A^2$ fit directly against the journal portions $5^2$ of the pin $B^2$, and if desired the eyes $3^2$ and the journal portions $5^2$ may be made of hardened iron or steel, to prevent excessive wear.

In Fig. 6 I have shown a further modification, in which the journal portion of the pin B³ is protected by a thimble 7³ and the eye 3³ of the side bar A³ bears directly thereagainst.

In Fig. 7 I have shown another form of pin coupler especially desirable for use in connecting the ends of chains. In this form the pin B⁴ is hollow for the insertion of an additional pin 16, which has a headed end 17 and is adapted to be inserted through the eyes 4⁴ of the side bars A⁴ and through the hollow portion of the pin B⁴. When it has been inserted, thus connecting the pin B⁴ of one link with the side bars of another link, its end 18 is upset and the chain is completely formed. Obviously, if desired, all of the links may be connected by means of a similar coupler 16.

In Fig. 8 I have shown a form of pin B⁵ in which the ends 6⁵ of the pin are made sufficiently long to contain cotter pin holes 19 for reception of cotter pins 20.

In Fig. 9 I have shown another form of pin, in which the pin has extended ends having recesses 21 formed in the sides thereof. The eye portion 4⁶ of the side bars A⁶ have upstanding lugs 22 which act as retainers for the cotter pins 23 when the latter have been inserted in the recesses 21.

In Figs. 10 and 11 I have shown further modifications of the pins and side bars, in which the ends of the pins have recesses 24, into which lips 25 of metal on the smaller eye portions of the side bars may be upset, for the purpose of securing the side bars to the pins.

It is obvious that modifications may be made in the forms of chain links which I have shown and described herein, and that various conveying means may be utilized in connection therewith, without departing from my invention.

What I claim is:

1. A chain formed of a series of links, each of said links comprising two side bars and a pin, each pin having a sprocket engaging portion, a plurality of conical portions, and a plurality of non-conical portions and each side bar having an eye portion with a conical opening and an eye portion with a non-conical opening, each side bar having a rotative engagement with one pin and a non-rotative engagement with a second pin, said side bars forming pulling connections between successive pins.

2. A chain link comprising two side bars and a pin, said pin having a central sprocket-engaging portion, said pin having a pair of conical journal portions and a pair of non-conical portions, each side bar having at one end an eye portion with a conical opening adapted to have a rotative bearing upon a journal portion of the pin, and at the other end an eye portion with a non-conical opening adapted to engage and fit a non-conical portion of the pin of an adjacent link, each of said side bars having a rotative engagement with its own pin, and a non-rotative engagement with the pin of an adjacent link.

3. A chain comprising a series of links, each link comprising a pin and a plurality of side bars, each pin having a body portion, a pair of conical journal portions and a pair of flattened portions, and each side bar comprising a body portion and an eye portion at either end of said body portion, one of said eye portions having a conical aperture adapted to turn upon a journal portion of a pin, and the other of said eye portions having an opening with a flattened side adapted to have a non-articulating engagement with a flattened portion of another pin, each of said pins having a journaled engagement with eye portions of one pair of side bars and a non-articulating engagement with eye portions of another pair of side bars.

4. A chain link comprising a pin and a plurality of side bars, each pin having a center or body portion, conical journal portions adjacent said body portion and smaller in diameter than said body portion, and means on the pin, between said body and said journal portions, adapted to limit the approach of said side bars, said bars having eyes engaging the journal portions of said pin.

5. A chain consisting of a plurality of links, each of said links comprising a pin and a plurality of side bars, said pin having a central portion, non-conical end portions and intermediate conical journal portions, a pair of side bars rotatively engaging the journal portions of said pin, and a pair of side bars fixedly engaging the ends of said pin, said rotatively-engaging side bars being held in engagement on said pin by the fixedly-engaging side bars, and means for securing the last-named side bars on the pin.

6. A chain formed of links, each link having side bars and a pin, each side bar being adapted at one of its ends to have a rotatable bearing on a journal portion of a pin, the said side bar being held upon said pin by the side bar of another link, the said second-mentioned side bar having a fixed engagement with said pin, and bendable means separate from but engaging the pin and retaining the second-mentioned link in position on said pin.

7. A chain formed of links, each link having side bars and a pin, said pin having recesses at its ends, each side bar being adapted at one of its ends to have a rotatable bearing on a journal portion of a pin, the said side bar being held upon said pin by the side bar of another link, the second-mentioned side bar having a fixed engagement with said pin, and having projections on its outer face adjacent its aperture, the said projections with recess on the pin comprising means for retaining the second-mentioned link in position on said pin.

8. A chain formed of links, each link having side bars and a pin, said pin having recesses at its ends, each side bar being adapted at one of its ends to have a rotatable bearing on a journal portion of the pin, the said side bar being held upon said pin by a side bar of another link, the second-mentioned side bar having a fixed engagement with said pin, and projections on the outer face of the second-mentioned side bar adapted to be bent over into recesses in the pin for retaining the second-mentioned side bar in position on said pin.

9. A chain consisting of a plurality of links, each of said links having side bars and a pin, each side bar being adapted at one of its ends to have a rotatable bearing on a journal portion of a pin, each said side bar being held upon said pin by a side bar of another link, the second-mentioned side bar having a fixed engagement with said pin, and bendable means integral with a side bar for retaining the second-mentioned link in position on said pin.

ALLAN S. BIXBY.

Witnesses:
F. R. ANGELL,
H. D. HAMMOND.